Nov. 24, 1964
M. KEMENCZKY
3,157,992
FLOW CONTROLLING DEVICE
Filed April 16, 1963
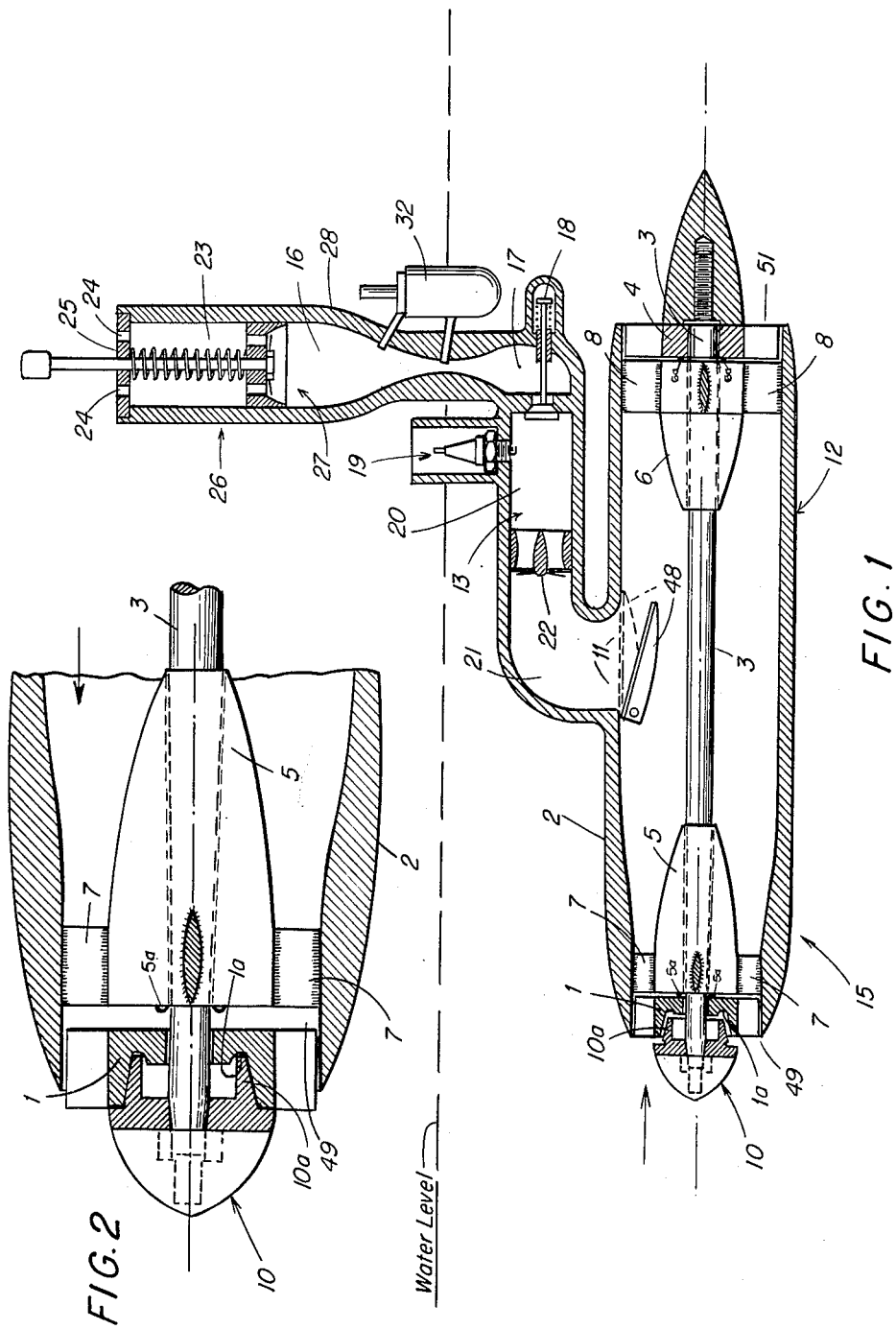

3,157,992
FLOW CONTROLLING DEVICE
Miklos Kemenczky, Maquoketa, Iowa, assignor to
Kemenczky Establishment, Vaduz, Liechtenstein
Filed Apr. 16, 1963, Ser. No. 273,340
1 Claim. (Cl. 60—35.6)

This invention relates to an improved flow controlling device which may be used in jet propulsion engines for watercraft, air-hydropulse pumping devices and similar structures. More particularly, the invention relates to an improved flow controlling device which comprises a pair of turbine wheels connected by a common shaft, one of said turbine wheels being located on the intake side of an impulse orifice in a thrust tube and the other of said turbine wheels being located on the exhaust side of impulse orifice.

The devices to which this invention relates are employed in jet propulsion engines of a type similar to that described in my application, Serial No. 40,452, filled July 1, 1960, entitled "Jet Propulsion Engine for Watercraft," which issued as United States Patent 3,060,682 on October 30, 1962. In these engines, the charge, consisting of a mixture of air and an easily combustible fuel, is drawn into a combustion chamber and ignited therein. The rapidly expanding combustion gases then pass through a series of compartments in the combustion chamber, through an impulse orifice, into a thrust tube. The thrust tube has an inlet opening for water forward of the impulse orifice and a discharge opening at the rear of the thrust tube aft of the impulse orifice. The rapidly expanding combustion gases being driven out of the combustion chamber act upon the column of water within the thrust tube, ejecting rearwardly from the tube, thereby producing a jet thrust reaction. This jet thrust can be utilized either to propel the jet motor forward through the liquid medium, or to pump the liquid rearwardly through the thrust tube.

In such devices, a closure valve, for example a flap valve, is generally placed at the impulse orifice of the combustion chamber leading into the thrust tube. Such a valve serves to separate the gases in the combustion chamber from the liquid in the thrust tube during the part of the cycle immediately preceding ignition of the combustible gases due to the suction produced by the liquid in the thrust tube rushing past the face of the orifice. A closure valve also serves to prevent wetting or quenching of the ignition system. As an alternative to a closure valve, a hydrodynamic grid type vent, such as is described in my copending application Serial No. 273,335, may also be employed. As indicated in said copending application, these vents have been found to be superior to closure valves and are a preferred means for use at the impulse orifice.

In devices of this kind, a check valve has been employed at the inlet side of the thrust tube. Check valves which have been employed include flap valves such as are disclosed in U.S. Patents 2,644,297 and 2,714,800. Such valves have the disadvantages of creating great front resistance and of failing to comply with the requirements of operation of a pulsating device since this type of valve cannot open and close as rapidly as necessary.

Another known type of jet propulsion engine for watercraft as disclosed, for example, in the French Patent No. 1,043,920, requires a separate compressor and is already for this reason unsuitable to form a light propulsion unit which may be used independently of any additional driving means. The requirement of a jet propulsion engine for boats and similar watercraft of being easily manipulatable and very economic in operation is also not fulfilled by a type of engine as disclosed, for example, in the U.S. Patent No. 2,412,825, in which the discharge part of the thrust tube operates according to the Venturi principle while the inlet side of the thrust tube is not provided with any valve. Jet propulsion engines of this type, which also require separate driving means for starting the engine, operate very inefficiently. Because of the almost complete absence of a compression within the combustion chamber, this lack of efficiency also applies to another type of jet propulsion engine for watercraft as disclosed, for example, in the German Patent No. 841,552, in which the upper part of a tubular work chamber forms a combustion chamber, while the lower part thereof which forms a direct continuation of the upper part is provided with a water inlet opening which is controlled by a flap valve and an opening at its rear end for ejecting the water. This type of water inlet will only permit a very slow succession of explosions, and has been found entirely inadequate in actual practice. Similar disadvantages are inherent in a pump of the type as disclosed, for example, in the German Patent No. 878,599, which operates according to the jet propulsion principle and may also be used for propelling ships. In this apparatus, the combustion chamber which is provided with a baffle plate which covers only a part of this chamber terminates directly without any intermediate check valve into a thrust tube, the front end of which is provided with a flap valve for controlling the water inlet, and the rear end of which is likewise provided with a valve which is intended to close the discharge opening to prevent any water from entering in the opposite direction. This rear valve, however, destroys almost the entire energy which is developed by the engine. Consequently, the efficiency of this pump—at least insofar as it may be used as a propulsion unit for a boat—is very poor.

According to the invention in my Patent 3,060,682, these deficiencies of the known jet propulsion engines for watercraft and especially small boats are overcome by providing such an engine with a combustion chamber which is divided into at least two compartments which are separated from each other by check valves and the last compartment of which terminates into the thrust tube, and by designing the valve which controls the water inlet opening of the thrust tube in the form of a low-inertia, quickly reacting check valve which operates in a manner similar to a turbine wheel and is provided with closing flaps in the form of blades which are pivotable about radial axes and are mounted on a freely rotatable wheel hub which is driven by the flow of water passing through this valve.

A jet propulsion engine which is designed in this manner will attain a high output even though it is not provided with a special compressor. For operating the engine, it is possible to use either liquid or gaseous fuels which, when mixed with air, form a highly explosive mixture. The engine may therefore be operated, for example, with gasoline of the same type as used in conventional carburetor engines. By dividing the combustion chamber into two or more separate chambers, the invention attains an additional compression of the combustible gases and thus a greater output of power due to an improved and more complete combustion.

The present invention represents an improvement over all of the above-mentioned valves and provides a means for the efficient control of fluids passing through the thrust tube with the maximum utilization of the energy of the fluid passing through the thrust tube and with the minimum amount of time required for the nonexplosive phase of the jet-motor cycle.

A principal object of the present invention is to provide a flow regulating device located in a conduit which device will offer minimal resistance to the flow of fluid going in one direction and which will offer maximum resistance to the flow of fluid going in the opposite direction.

Another object of the present invention is to provide a flow regulating device located in a thrust tube, which device will offer minimal resistance to the flow of fluid entering the intake of the thrust tube and which will offer maximum resistance to the flow of fluid in the direction opposite to this.

Another object of the present invention is to provide a flow regulating device for a jet propulsion engine for watercraft which will control the flow of fluid through the thrust tube of the jet propulsion engine while causing a minimum of turbulence in the thrust tube.

An additional object of the invention is to provide a device which will operate over a wide range of engine speeds, without inducing objectionable vibrations and which also serves as an effective means for distintegrating water plants which might otherwise clog the jet propulsion engine.

A further object of the present invention is to provide a flow regulating device which can be readily and economically manufactured.

It is still a further object of the present invention to provide a flow controlling device for a jet propulsion engine for watercraft which is capable of reducing the time lag between the thrust phase and the suction phase of the jet propulsion engine, so that the ratio of thrust phase time to suction phase time is increased over that which exists without such a flow control device.

Other objects of the invention will in part be obvious and will in part appear hereinafter.

The flow regulating device of the present invention comprises a pair of turbine wheels connected by a common shaft, one of said turbine wheels (the forward turbine wheel) being located on the intake side of an impulse orifice in a thrust tube and the other of said turbine wheels (the aft turbine wheel) being located on the exhaust side of said impulse orifice. The aft turbine wheel is, in the preferred form of the invention, as in FIGS. 1 and 2, rigidly attached to the common shaft and rotates with said shaft. The forward turbine wheel is mounted on said shaft in such a manner that (1) it rotates independently of said shaft when the fluid pressure on the aft side of said forward turbine wheel is less than the fluid pressure on the forward side of said forward turbine and (2) it connects to said shaft and rotates therewith when the fluid pressure on the aft side of said forward turbine wheel is less than the fluid pressure on the forward side of said forward turbine wheel. In addition, the mass and blade area (driving force) of the aft turbine wheel, in combination with the shaft, should be greater than the mass and blade area of the forward turbine wheel. As will be seen from the description which follows, the invention will also include an arrangement where the forward turbine wheel is rigidly attached to the shaft and rotates therewith and the shaft is adapted to engage or be free of engagement with the aft turbine wheel under the same conditions set forth above, so long as the combined mass of the forward turbine wheel and shaft, in this instance, is less than the mass of the aft turbine wheel and so long as the blade area and driving force of the aft turbine wheel is greater than the blade area and driving force of the forward turbine wheel.

The invention, accordingly, comprises the features of construction, combination of elements, and an arrangement of parts which will be exemplified in the constructions hereinafter set forth, and the scope of the invention will be indicated in the claim.

For a fuller understanding of the nature and objects of the invention, reference should be had to the following detailed description taken in connection with the accompanying drawings, in which:

FIG. 1 is a sectional side elevational view illustrating an embodiment of the flow regulating device of the present invention in a jet propulsion engine for watercraft, showing the arrangement of parts when the flow is in the indicated direction;

FIG. 2 is an enlarged partial sectional side elevational view of the embodiment of the flow regulating device of the present invention shown in FIG. 1, illustrating the arrangement of parts when the flow is in the opposite direction from that shown in FIG. 1.

Referring to the drawings in which like numerals identify similar parts throughout it will be seen, as illustrated in FIGS. 1 and 2, that one embodiment of the present invention includes a flow regulating device 15 located in a thrust tube 12 of a jet engine for watercraft 15. The jet engine 15 is similar to the jet engine for watercraft which is shown and more fully described in my application Serial No. 40,452, supra.

As shown in FIG. 1 the jet engine 15 can have an air intake 16, a carburetor 17, a spring loaded combustion valve 18 through which the fuel mixture is drawn from the carburetor, and ignition means 19 for igniting the fuel mixture in combustion chamber 13. The combustion chamber 13 is preferably divided into at least two compartments, the first compartment 20 and the second compartment 21 which are separated by one-way valve 22. Combustion air flows to carburetor 17 through an air pump 23 by means of apertures 24, 24 in the end 25 of an air pump housing 26 and through a piston 27 which, when the engine is in operation, is in stationary position. The housing 26 of this hand operated, spring loaded starting air pump 23 forms part of the intake pipe 28 for the combustion air. Gasoline or other fuel can be introduced into carburetor 17 through fuel float means 32. Chamber 21 connects with the interior thrust tube 12 through opening 11, which is adapted to be opened or closed by a flap valve 48. Alternatively, flap valve 48 can be replaced by a hydrodynamic valve which comprises a grid type vent, as disclosed in my copending application Serial No. 273,335.

The flow regulating device of the present invention comprises forward turbine wheel 1 which is located within the water inlet opening 49 of thrust tube 12. Turbine wheel 1 is rotatably mounted on shaft 3 which is in the axial center of thrust tube 12. At the opposite end of shaft 3 at the outlet opening 51 is a second turbine wheel, aft turbine wheel 4, which functions as a propulsion turbine. Shaft 3 is held in a free-wheeling manner by input equalizer 5 and output equalizer 6 having thrust bearings 5a and 6a, respectively. Input equalizer 5 and output equalizer 6 are held in position within thrust tube 12 by means of ribs 7 and 8. Turbine wheel 4 is rigidly attached to shaft 3 and can rotate only with shaft 3. Turbine wheel 1 is free-wheeling in both directions on shaft 3. As shown in FIG. 1, on the front end of shaft 3 is mounted cap 10, which is rigidly attached to shaft 3 and rotates continuously with shaft 3. Cap 10 has a frusto-conically shaped end 10a. Turbine wheel 1 has a hollow cone shaped section 1a which is adapted to engage end 10a of cap 10. End 10a of cap 10 protrudes into the hollow frustro-conically shaped section 1a of turbine wheel 1. Turbine wheel 1 is axially movable to the extent that it can engage and disengage with cap 10 by means of frictional contact between end 10a and section 1a. The surfaces of end 10a and section 1a need only be separated by a small distance sufficient to permit a complete free-wheeling motion of turbine wheel on shaft 3.

In operation, the embodiment of the present invention shown in FIGS. 1 and 2 functions as follows:

When the direction of fluid flow is as shown in FIG. 1, the exploding gases from combustion chamber 21 have already forced the fluid through turbine 4 and outlet 51. Turbine 4 and shaft 3 are rotating with the inertia resulting from the water having passed therethrough. Since at this point the fluid pressure on the aft side of turbine 1 is less than the fluid pressure on the forward side of turbine 1, turbine 1 does not engage cap 10 and is free to rotate due to the in rushing water entering inlet 49 of thrust tube 12. The suction created by turbine 4 rotating helps to accelerate the inflow of water into thrust tube 12 and to accelerate the inflow of air and combustion gases into combustion chamber 21. Since there is a smaller pressure within the thrust tube than its surroundings, the external pressure will press turbine wheel 1 against the input equalizer 5, where it can rotate freely. The aft turbine wheel 4 has a larger cross section than forward turbine wheel 1 and turbine wheels 1 and 4 further differ in the angular position of their blades. These angular and dimensional variations of blades are already known in jet motors for airplanes. This arrangement creates a torque on the shaft 3 with its 2-turbine wheels from the direction toward the propulsion turbine, if the pressure within the thrust tube is larger than its surroundings. Accordingly, turbine wheel 1 is driven by aft turbine wheel 4 when forward turbine wheel 1 is held on shaft 3 by friction (when the pressure within the thrust tube 12 is larger than its surroundings). Since the pressure within the thrust tube 12 has two characteristics one pressure and the other vacuum, turbine wheel 1 functions, according to this invention, alternately as a pump and as a lossless open valve. Turbine 4 and shaft 3 when connected to each other have a much larger mass and when rotating a much larger moment of momentum than turbine wheel 1. The moment of momentum of propulsion turbine 4 and shaft 3 replace the kinetic energy of the water in the long thrust tube and thus eliminate the friction loss of water in the long thrust tube and make a short thrust tube possible. According to this invention, the requirement for a long thrust tube in prior jet motors of this type is eliminated and the amount of time required to fill the thrust tube with fluid is greatly reduced.

A jet propulsion engine incorporating the present invention will operate as follows:

Combustion chamber 13 is filled with a combustible mixture at atmospheric pressure and thrust tube 12 is filled with water. The spark plug 19 ignites the mixture composing a high pressure explosion in chamber 13 and the gases expand through valve 48 into the thrust tube pushing the water out. At that moment, fluid forces are introduced upon the blades of the turbine wheel 1 and turbine wheel 4. When the angular blade position of the turbine wheel 4 are selected in such a manner that turbine wheel 4 will rotate clockwise with shaft 3, turbine wheel 1 with the same blade position will have the tendency to rotate counter-clockwise to permit the fluid to leave. Since the pressure in thrust tube 12 on turbine wheel 1 is greater than the pressure forward of turbine wheel 1, turbine wheel 1 is connected through end 10a and section 1a to make a solid connection with cap 10 and shaft 3. Turbine wheel 1 is forced to rotate in the direction of turbine wheel 4 which functions as a propulsion turbine. Thus, when a large pressure due to explosion exists in thrust tube 12, both turbine wheels rotate clockwise with the same number of revolutions. Under these conditions turbine wheel 1 will not permit any water to flow into the forward direction through the inlet opening and, in fact, at the number of revolutions which will result from normal operation of the jet motor turbine wheel 1 actually forces water to flow into thrust tube 12, even during the explosion portion of the cycle. This gives an additional backward pressure and results in a greater thrust. Thus, at the explosion, turbine wheel 1 functions as a pump which is caused to rotate by a turbine wheel 4, which serves as a motor, and the water is pumped through turbine 1 into thrust tube 12 at a high speed.

The propulsion turbine wheel, aft turbine wheel 4, which has a larger moment of inertia than turbine wheel 1, is accelerated to a very rapid rotation by the flow of water through it during the explosion phase. The moment of inertia of the turbine wheel 4 continues the rotation after the explosion phase has been completed. Since, at that moment, turbine wheel 1 is still coupled to shaft 3, turbine wheel 1 causes a vacuum in thrust tube 12 which fills the explosion chambers with fresh combustion mixture. This vacuum is short-lived because the external pressure releases the coupled condition between the shaft 3 and turbine wheel 1 and turbine wheel 1 begins to rotate faster and the still existing vacuum sucks fresh water into thrust tube 12, with substantially no friction and no turbulence. When the motor is in forward movement, dynamic pressure is added to the vacuum, thereby further facilitating the filling of thrust tube 12 with water in a relatively short period of time. Turbine wheel 4 will lose substantially none of its moment of inertia during this non-explosive (nonactive) period, since this turbine is rotated by the exhaust gases as well as by the water or liquid passing through it. By the time the water mass has moved to the aft, propulsion turbine 4, the next explosion can take place and the cycle can be repeated.

The fundamental concept of this invention comprises the fact that the propulsion turbine wheel 4 has a steady and uniform number of revolutions and the driven turbine wheel 1 rotates slower during the explosion and faster at the inflow of water. At normal operation of the jet motor the number of revolutions of the turbine wheel 1 is periodically smaller and larger and alternately the turbine wheel 1 is coupled with shaft 3 and self-functioning as a pump and again alternately when free-wheeling will act as a pump valve.

Obviously shaft 3 can be coupled to turbine wheel 1 in other ways than are shown in FIGS. 1 and 2. For example, clutch plates and the like, as are well known in the motor art, can be employed in place of the conically shaped units 10a and 1a employed in FIGS. 1 and 2, the only requirement being that the forward turbine wheel 1, which is otherwise free to rotate, be coupled through the shaft to the aft turbine wheel, so that they rotate as a unit, when the pressure aft of the forward turbine wheel is greater than the pressure forward of the forward turbine wheel.

The parts of the apparatus of this invention can be constructed of metal, plastic or other materials known in the motor art. In particular, the frustro-conically shaped units 10a and 1a can be constructed of metal, plastic or rubber.

I claim:

A jet propulsion engine for use on watercraft or as a fluid pump, comprising a thrust tube having a fluid inlet opening and a discharge opening, a combustion chamber with means for supplying a combustible mixture of fuel and air to said combustion chamber, and an ignition means for igniting said fuel mixture in said combustion chamber, a discharge means for connecting said thrust tube with said combustion chamber so that the combustion gases from said combustion chamber may pass through said discharge means into said thrust tube to eject water from said thrust tube through said discharge opening and a flow controlling device comprising a pair of turbine wheels in said thrust tube positioned on a common shaft, the first of said turbine wheels having a greater moment of inertia than the second of said turbine wheels and being rigidly attached to said shaft downstream of said discharge means, the second of said turbine wheels being located in the forward position on the shaft near the inlet opening and being free to rotate independently of the shaft when the fluid pressure on the outside of said inlet opening is greater than the fluid pressure on the inside of said second turbine wheel, and said second turbine wheel being adapted to lock in place on said shaft to rotate in the same direction as said first turbine wheel when the pressure within said thrust tube is greater than the pressure outside the inlet opening of said thrust tube.

References Cited in the file of this patent
UNITED STATES PATENTS 3,060,682   Kemenczky _____ Oct. 30, 1962